United States Patent
Scheppele

[15] 3,672,334
[45] June 27, 1972

[54] APPARATUS FOR DISTRIBUTING ANIMAL FEED

[72] Inventor: Lyle W. Scheppele, Dubuque, Iowa
[73] Assignee: Toledo Stamping & Manufacturing Co., Toledo, Ohio
[22] Filed: March 2, 1970
[21] Appl. No.: 15,782

[52] U.S. Cl.......................................................119/52 B
[51] Int. Cl. .............................................A01k 05/00
[58] Field of Search..............119/52, 56, 52 B; 74/240, 252, 74/243

[56] References Cited

UNITED STATES PATENTS

| | | | |
|---|---|---|---|
| 3,306,261 | 2/1967 | Purdy | 119/56 |
| 2,101,685 | 12/1937 | Nisbet | 74/240 X |
| 3,382,730 | 5/1968 | Roggatz | 74/240 |
| 805,625 | 11/1905 | Blank | 119/56 UX |
| 1,481,542 | 1/1924 | Dunsieth, Jr. | 119/56 UX |

Primary Examiner—Hugh R. Chamblee
Attorney—Allen D. Gutchess, Jr.

[57] ABSTRACT

A cattle feeder is provided with an improved drive arrangement. The feeder includes a conveyor belt which carries feed and a carriage movable on the belt to discharge the feed off the sides of the belt. The improved drive arrangement for the carriage includes a sprocket at one end of the conveyor engaging a link chain connected to the carriage. Guides adjacent the sprocket maintain the chain properly oriented with respect thereto. One end of the chain is connected directly to the carriage and the other end preferably is connected to the carriage through a length of cable which extends around an idler pulley at the opposite end of the conveyor belt.

12 Claims, 5 Drawing Figures

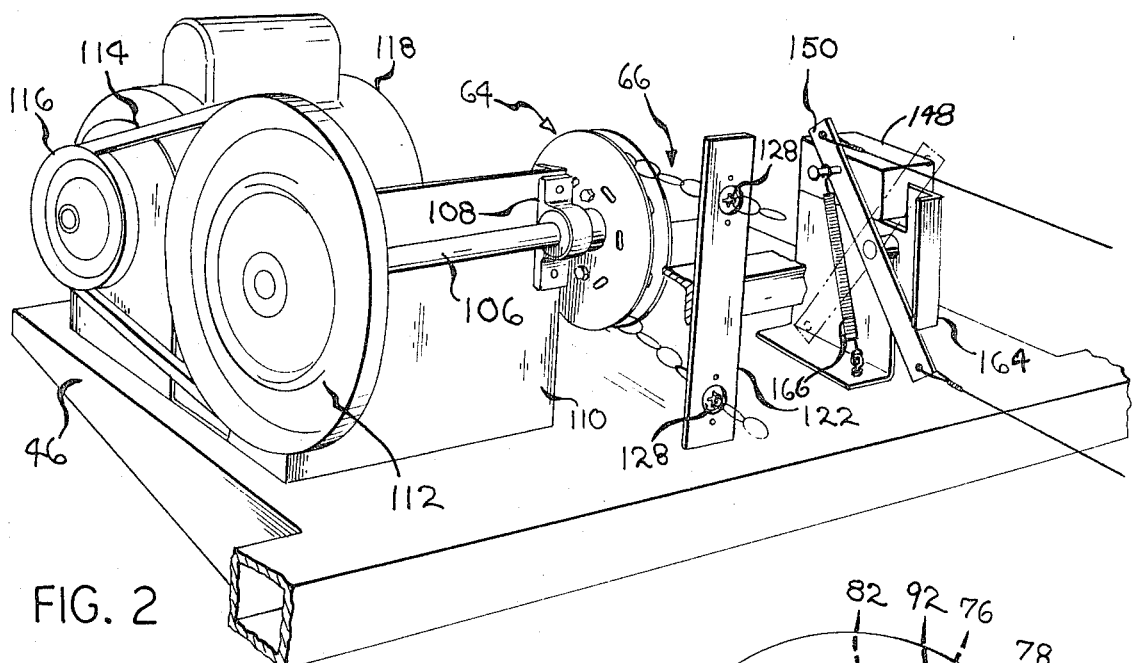
FIG. 2
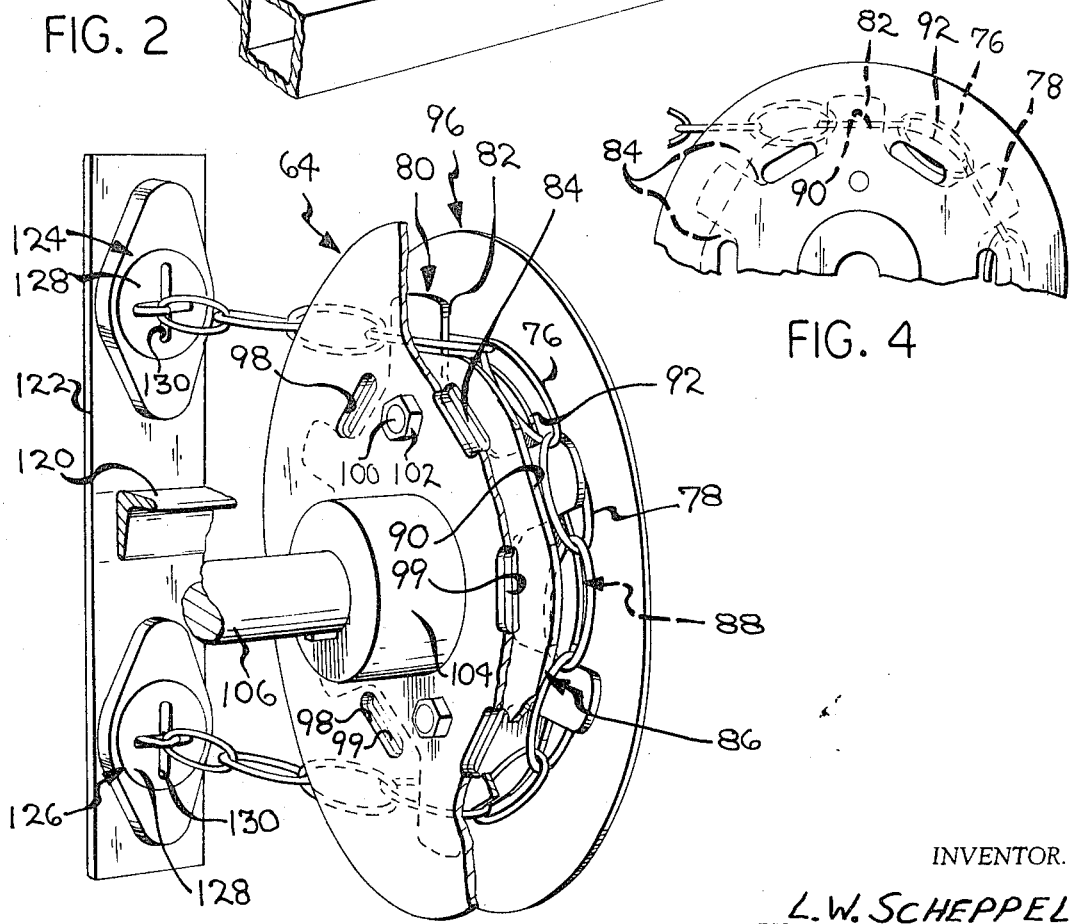
FIG. 3
FIG. 4
INVENTOR.
L. W. SCHEPPELE
BY Allen D. Gutchess, Jr.
ATTORNEY

APPARATUS FOR DISTRIBUTING ANIMAL FEED This invention relates to apparatus for distributing animal feed and more particularly to an improved drive for operating a carriage of a belt-type cattle feeder.

Apparatus for mechanically distributing animal feed is now known in the art and has received widespread acceptance. One such apparatus moves the feed through the use of augers, which tend to be expensive, however, and difficult to maintain. The augers also tend to wear relatively rapidly and do not move the feed well on an incline. Further, the augers tend to segregate finer and coarser feed material, such as grain and supplement, the finer material tending to be discharged first.

The present invention relates to a belt-type feeder which includes a conveyor belt carrying the feed directly from a silo or other supply source and distributes it throughout the length of a feedbunk. A carriage rides back and forth on the belt and has means to discharge the feed from either or both sides of the belt into the feedbunk trough. The carriage discharges the feed when moving in both directions on the belt with the carriage moving more slowly than the belt when traveling in the same direction so that feed on the belt is moved into contact with the carriage.

Specifically, the present invention relates to drive means for operating the carriage and for moving it back and forth on the feed conveyor belt. Heretofore, the carriage has been moved on the conveyor belt through a rope and pulley arrangement. Plastic, and specifically polyethylene, rope has been employed with a multiple pulley drive being used that required a length of rope approximately equal to three times the length of the belt conveyor. Even with a multiple pulley arrangement, the rope would tend to slip from time to time and, if such slipping were severe, the rope would burn or wear through, requiring replacement of the entire length. Further, the rope would tend to stretch, particularly when initially installed, and usually required tightening by a service man. In cold weather, the rope would also stiffen and consequently not operate effectively.

The drive means of the invention includes a sprocket located at one end of the belt, preferably the outer end, with suitable means for driving the sprocket and reversing its direction of rotation when the carriage is near either end of the belt. A link chain extends circumferentially around a portion of the sprocket with a lower run of the chain being connected to the carriage. An upper run of the chain is fastened to a cable which extends around an idler pulley at the opposite end of the conveyor belt and is then connected to the carriage. The chain employed is of a conventional straight link type and is relatively low in cost, particularly as compared to special chains or the like commonly employed in chain drives. A pair of guides have non-circular openings receiving the upper and lower runs of the chain and maintain the chain oriented with regard to the sprocket.

The sprocket is of a unique design, having radially extending, equally spaced teeth with adjacent flat link-supporting surfaces on each side of the teeth to support the links which are engaged by the teeth. With this design, lighter weight links can be used to provide the necessary pulling strength without bending. Circular flanges are spaced beyond these supporting surfaces to help guide the chain links onto the teeth. Slots are also provided in the flanges adjacent the link-supporting surfaces to enable the escape of feed which might otherwise be collected on the sprocket.

The new drive has a number of advantages over those heretofore employed. In particular, the drive is positive and moves the carriage without slipping. There is substantially no stretch in the chain or cable and proper take-up and tension can be achieved with a relatively simple adjustment. Further, there is substantially no wear of the chain and cable nor are they affected to any extent by cold weather. In addition, should part of the chain need to be replaced, this can be done through replaceable repair links without the need for substituting an entire new chain.

By using the combined chain and cable, and with the power drive at the outer end of the belt conveyor away from the supply source, only the cable ever comes into contact with the feed on the belt between the supply source and the carriage. Further, the cable is of small diameter and has the main strands impregnated and the outer surface coated with plastic to provide a smooth surface. As such, feed does not collect on the cable nor does the cable interfere with the feed.

It is, therefore, a principal object of the invention to provide apparatus for distributing animal feed with an improved drive arrangement having the advantages discussed above.

Many other objects and advantages of the invention will be apparent from the following detailed description of a preferred embodiment thereof, reference being made to the accompanying drawings, in which:

FIG. 2 is an enlarged view in perspective of drive means for a carriage of the feeder;

FIG. 3 is a view in perspective, with parts broken away, of a chain sprocket and guides embodied in the drive means of FIG. 2;

FIG. 4 is a fragmentary side view in elevation of the sprocket of FIG. 3; and

FIG. 5 is a detailed view of a chain connection and take-up for connecting the chain to the carriage.

Figure 1:
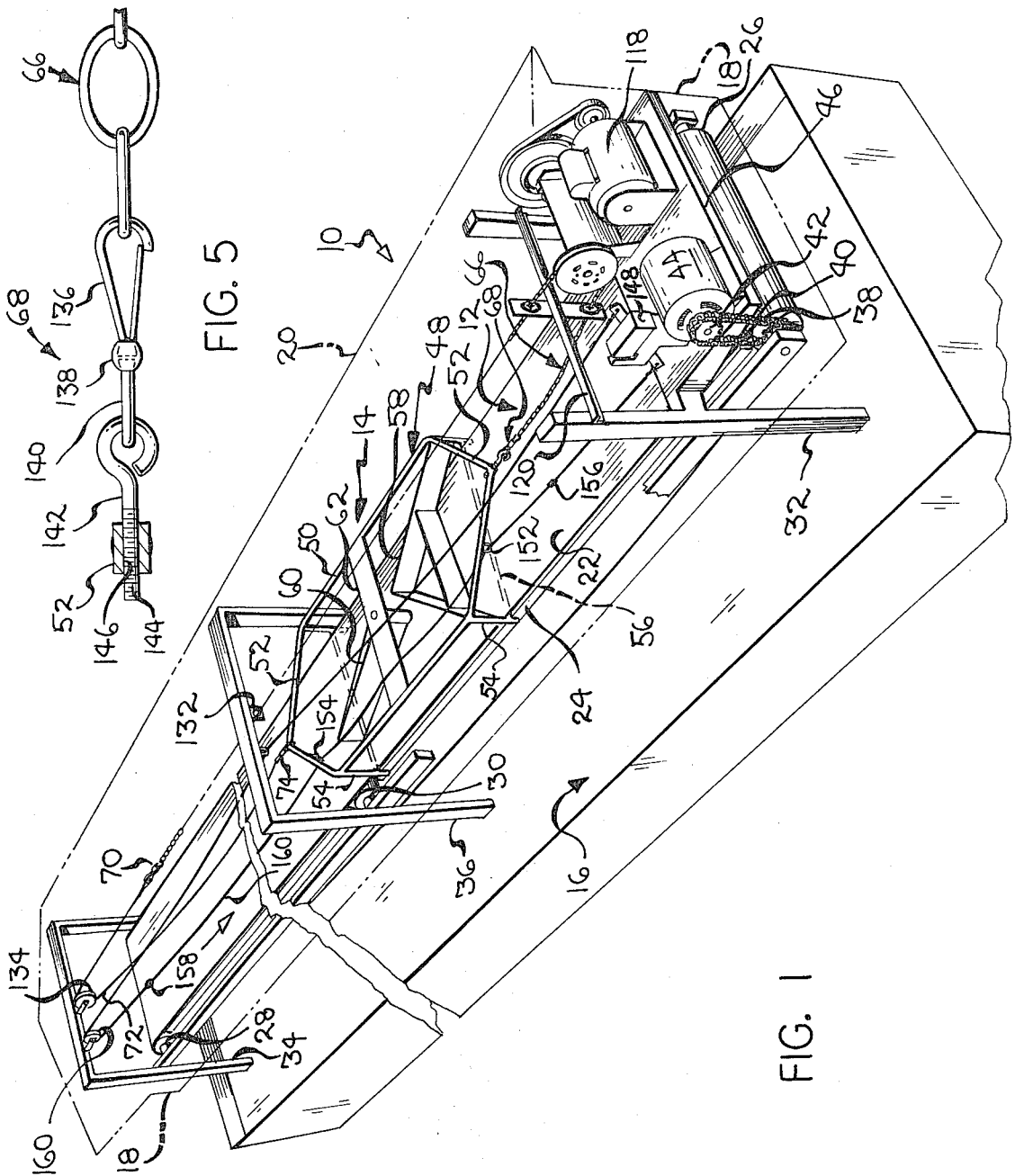
FIG. 1 is a fragmentary, somewhat schematic, overall view in perspective of a belt-type feeder embodying the invention.

Referring particularly to FIG. 1, a belt-type feeder embodying the invention is indicated at 10. The feeder 10 basically comprises a belt 12 which is continuously moved in the direction of the arrow and carries feed therealong supplied at the end near the arrow by suitable means (not shown). A carriage 14 moves back and forth over a substantial portion of the length of the belt 12 and includes discharge means for discharging the feed transversely off the belt and into a feedbunk trough 16 shown somewhat schematically. When the carriage 14 moves in the same direction as the belt 12, it moves more slowly than the belt so that the feed on the belt is carried into contact with discharge means of the carriage and discharged off the side of the belt. When the carriage 14 moves in the direction opposite to the belt, it contacts and discharges feed regardless of the velocity of the carriage. The belt 12 and the carriage 14 are enclosed in side walls indicated by dotted lines 18 and by a roof indicated by dotted lines 20 to protect the structure and feed from wind and weather. Overall belt-type feeders of the type shown in FIG. 1 are known in the art, as shown in Purdy U.S. Pat. No. 3,306,261, and will not be discussed in detail.

An upper run 22 of the belt 12 is supported on a bed or platform 24 and extends around a drive roller 26 at the drive end and an idler roller 28 at the opposite end where the feed is supplied. Intermediate rollers such as rollers 30 can also be employed, if desired. The belt is supported above the feedbunk trough 16 by end frames 32 and 34 and intermediate frames 36. The belt 12 is driven from the outer end, away from the feed supply end, by suitable drive means such as a sprocket 38, a chain 40, a drive sprocket 42, and a motor 44. The motor 44 is supported above the belt on a suitable platform 46 in turn supported on the end frame 32. By driving the belt at the outer end, the upper run is pulled by the drive, rather than pushed, as would be the case if driven from the feed supply end.

The carriage 14 includes a framework 48 having side frames 50, end frames 52, uprights 54, and transverse members 56 extending under the belt 12 and supported on the bed 24. A plate extends between the transverse members 56 under the belt to provide support for a plow or deflector 58 and a vane 60 riding on top of the belt, the plow and vane constituting the discharge means of the carriage 14, although other arrangements can be employed to discharge the feed off the belt. The vane 60 is pivotally supported from a plate 62 extending between the side frames 50. The vane can be moved back and forth transversely of the belt by suitable means (not shown) to discharge the feed off one side of the belt or the other, although certain types of feed can be discharged off both sides by the plow 58 if the vane 60 is removed.

The carriage 14 is driven back and forth on the belt 12 by improved drive means embodying the invention. The drive means includes a sprocket 64 engaging and driving a link chain 66 having one end attached by a connector 68 to the nearer end frame 52 of the carriage 14 and the other end connected by a loop connector 70 to an end of an elongate flexible member or cable 72. The other end of the cable 72 is connected to the other end frame 52 of the carriage 14 through another suitable loop connector 74. The chain 66 is of a conventional link type, having mutually perpendicular oval connecting links 76 and 78 (FIGS. 3 and 4). The chain 66 is readily commercially available but preferably has slightly closer tolerances, sometimes designated calibrated chain, than standard straight link chain.

The cable 72 is of a conventional type consisting of metal strands but is preferably coated with or embedded in a plastic material so as to present a smooth outer surface. Also, the cable can be of a small diameter, as small as five thirty-seconds inch, by way of example. Because of the length of the feeder 10, the cable 72 cannot be under sufficient tension in most instances to keep it above the upper run 22 of the belt 12. Hence, a portion of the cable usually will be on the belt and in contact with the feed thereon. However, with the small diameter and with the smooth surface, the cable 72 will not interfere with feed on the belt to any extent nor pick up the feed.

When the carriage 14 is nearer the supply end of the belt 12, a portion of the chain 66 will also often lie on the belt. However, the belt between the drive end and the carriage 14 is free of feed, which has been discharged by the discharge means of the carriage, so that there is no problem of the chain 66 interfering with the feed or collecting it thereon.

The sprocket 64 (FIGS. 3 and 4) is of a unique design having several advantages. The sprocket 64 includes a central sprocket plate 80 having uniformly spaced, radially extending teeth 82 with recesses 84 therebetween. The teeth engage the links 78 while the recesses receive the intermediate links 76. On each side of the sprocket plate 80 are supporting plates 86 and 88. These are identical and include flat link-supporting surfaces 90 on each side of the teeth 82 with rounded portions 92 between the flat surfaces 90. The surfaces 90 of the plates 86 and 88 support the links 78 engaged by the teeth 82 and prevent possible bending or flexing of the links on the sprocket 64. With this support, a substantially lighter chain can be employed than otherwise if a conventional sprocket were used, for example. The links 78 are shown on the surfaces 90 in FIG. 4 but are shown above the surface 90 in FIG. 3, for clarity of illustration.

Beyond the supporting plates 86 and 88 are a pair of outer flange plates 94 and 96 forming circular flanges to receive and guide the chain 66 therebetween. The flange plates 94 and 96 have a plurality of elongate openings 98 therein communicating with openings 99 in the supporting plates 86 and 88. These openings 98 and 99 enable any feed or other material collected on the chain 66 and deposited on the sprocket in the recesses 84 to be discharged, thereby rendering the sprocket self-cleaning.

The plates 80, 86,88, 94, and 96 are fastened together through bolts 100 and nuts 102 and are mounted on a hub 104. The hub 104 is suitably affixed by a key or setscrews on a drive shaft 106. The shaft 106 is rotatably supported by a bearing block 108 (FIG. 2) mounted on a plate 110 which, in turn, is supported on the platform 46. The shaft 106 is driven through a pulley 112, a belt 114, and a drive pulley 116 driven by a motor 118.

A cross bar 120 extends in front of the sprocket 64 and carries an upright supporting bar 122. A pair of chain guides 124 and 126 (FIG. 3) are fastened to the supporting bar 122 and have cylindrical plastic bodies 128 mounted therein with cross-shaped passages 130 formed to receive the mutually perpendicular links 76 and 78 and to maintain them in properly oriented relationship as they engage the sprocket 64. The guides also prevent the chain from twisting when engaged by the sprocket. The chain is also supported by the intermediate frames 36 through suitable supports 132 (FIG. 1) having glass insulators with circular openings receiving the chain.

The cable 72 is supported at the supply end of the belt 12 through an idler pulley 134 rotatably mounted on the end frame 34. The chain and cable are of such lengths that the chain never comes into contact with the idler pulley 134 nor does the cable 72 come into contact with the sprocket 64 nor even the upper guide 124. The chain and the cable will each be of a length somewhat exceeding the length of the upper run 22 of the belt 12. However, because the carriage usually is moved closer to the drive or outer end of the belt 12 than to the supply or feed end thereof, the chain is usually somewhat longer than the cable.

The loop connectors 70 and 72 can simply be made by looping an end portion of the cable back on itself and affixing it by a cable clamp or a crimped sleeve. The looped cable portion can then be connected directly to a chain link or to a snap-swivel at the end of the chain. Where the chain 66 connects to the end frame 52 of the carriage 14, the connector 68 includes a hook means or snap 136 (FIG. 5) connected by a swivel 138 and a ring 140 to an eye-bolt 142. The eye-bolt can be several inches long and has a threaded shank 144 threadedly engaged in a passage 146 of the end frame member 52. With this arrangement, it is a relatively simple matter to take slack out of the chain and cable by threading the eye-bolt 142 further in the frame member. This represents a substantial improvement over the drives heretofore known which have usually required servicemen to properly tension the rope drives employed.

The motor 118 is of the reversing type and can be reversed by any suitable means when the carriage 14 approaches each end of the upper run 22 of the belt 12. By way of example, the motor can be connected to a reversing switch 148 (FIGS. 1 and 2) which is operated by an over-center lever 150. The lever 150 is moved between the solid line and dotted line positions of FIG. 2 when eyes 152 and 154 (FIG. 1) on the end frames 52 engage enlarged obstructions 156 and 158, such as cable clamps, on a rope 160. The rope extends from the ends of the lever 150 around a supporting pulley 162 at the opposite end of the belt. The lever 150 remains in the position to which it is moved against a stop 164 by an over-center spring 166. Each change in position of the arm or lever 150 reverses the direction of the motor 118.

From the above, it will be seen that the drive means embodying the invention has a number of advantages over the art. The chain and sprocket combination provides positive drive for the carriage without possibility of slipping. Further, there is no lengthy rope to slip or to be replaced if burned or worn out. The thin, smooth cable 72 does not interfere with the feed on the belt 12 nor does it carry the feed into contact with the pulley 134 or other components. The chain 66 at the outer end of the carriage 14 does not come into contact with the feed and does not carry it to the sprocket 64. One or a few links of the chain can be replaced, too, if necessary, without replacing the entire length.

The sprocket 64 is of a unique design with the links 78 engaged by the teeth 82 being supported on the flat surfaces 90 of the plates 86 and 88. Further, the openings 98 and 99 in the flange plates 94 and 96 assure discharge of any feed and contaminants on the sprocket. The flange plates 94 and 96 further aid in guiding the chain 66 properly on the teeth 82 and the special chain guides 124 and 126 assure proper orientation of the chain with respect to the sprocket.

Various modifications of the above described embodiment of the invention will be apparent to those skilled in the art and it is to be understood that such modifications can be made without departing from the scope of the invention, if they are within the spirit and the tenor of the accompanying claims.

I claim:

1. In an elongate animal feedbunk having a continuous delivery feed belt extending generally lengthwise thereof for carrying animal feed from a supply end toward the opposite end, a carriage including discharge means positioned relative to said belt to contact feed and being effective to discharge the feed transversely thereof, power means to move said belt in a lengthwise direction with an upper run of the belt moving from the feed supply end to the opposite end, and drive means for moving the carriage from one point longitudinally of the belt for a preselected distance to another point and then back in the reverse direction toward said one point, the improvement comprising said drive means including a sprocket rotatably supported near said opposite end of said belt, means for rotating said sprocket in one direction and then the other, a chain having a portion extending circumferentially around a portion of said sprocket and having upper and lower runs extending longitudinally of said belt, chain guide means positioned to receive at least the upper run of the chain, said guide means having a non-circular opening cooperating with said chain to maintain said chain oriented with respect to said sprocket, and means connecting the upper and lower runs of said chain to said carriage to move said discharge means longitudinally of the belt, said connecting means including an elongate flexible member connected to said upper run of said chain and to said carriage, said lower run of said chain being connected substantially directly to said carriage.

2. Apparatus according to claim 1 wherein said elongate flexible member comprises a cable connecting the upper run of said chain said to said carriage.

3. Apparatus according to claim 2 characterized by an idler pulley near said supply end of said belt, and said cable extending around said pulley to said carriage.

4. Apparatus according to claim 2 characterized by the length of said chain and the length of said cable each being approximately equal to the length of said feed belt.

5. Apparatus according to claim 4 characterized further by the length of said chain exceeding the length of said cable.

6. In an elongate animal feedbunk having a continuous delivery feed belt extending generally lengthwise thereof for carrying animal feed, a carriage including discharge means positioned relative to said belt to contact feed and being effective to discharge the feed transversely thereof, power means to move said belt in a lengthwise direction, and drive means for moving the carriage from one point longitudinally of the belt for a preselected distance to another point and then back in the reverse direction toward said one point, the improvement comprising said drive means including a sprocket rotatably supported near the one point, means for rotating said sprocket in one direction and then the other, a chain having a portion extending circumferentially around a portion of said sprocket and having upper and lower runs extending longitudinally of said belt, chain guide means positioned to receive at least the upper run of the chain, said guide means having a non-circular opening cooperating with said chain to maintain said chain oriented with respect to said sprocket, and means connecting the upper and lower runs of said chain to said carriage to move said discharge means longitudinally of the belt, said connecting means including an elongate flexible member connected to said upper run of said chain and to said carriage, said lower run of said chain being connected substantially directly to said carriage, said sprocket comprising means forming a multiplicity of equally spaced, radially extending teeth on the periphery of the sprocket, and means forming a plurality of flat, link-supporting surfaces on each side of said teeth to support chain links engaged with the teeth.

7. Apparatus according to claim 6 characterized by said sprocket having openings to discharge any feed tending to collect between said sprocket teeth.

8. In a livestock feeder, a belt conveyor, feed trough means extending longitudinally of said conveyor and positioned to receive feed discharged therefrom, a carriage movable longitudinally of the conveyor and having means for discharging feed transversely from the conveyor and into said feed trough means, power means to move the belt in a lengthwise direction, and drive means for moving said carriage back and forth over at least a substantial portion of the length of said belt, the improvement comprising said drive means including rotatable engaging means, means for rotatably supporting said rotatable engaging means above and near one end of said belt, means for rotating said rotatable engaging means, a chain engaged with said rotatable engaging means and having a lower portion connected to said carriage, and an upper portion extending longitudinally of the belt, an elongate flexible member connected to said upper portion of said chain, idler means spaced from said rotatable engaging means, said flexible member extending around said idler means and being connected to said carriage, said rotatable engaging means comprising a sprocket including a plurality of equally circumferentially positioned, radially extending teeth and means forming link-supporting surfaces on each side of said teeth to support links engaged by said teeth, an upper chain guide receiving an upper portion of said chain adjacent said sprocket, a lower chain guide receiving a lower portion of said chain adjacent said sprocket, said chain guides having non-circular openings to orient said chain in pre-determined relationship to said sprocket.

9. Apparatus according to claim 8 wherein said chain is of a length sufficient to always engage said rotatable engaging means for any position of said carriage on said belt and said flexible member is of a sufficient length to always engage said idler means for any position of said carriage on said belt.

10. Apparatus according to claim 8 characterized by said sprocket forming recesses between said teeth, said link-supporting surfaces being below the extremities of said teeth and above the bottoms of said recesses.

11. Apparatus according to claim 10 characterized by said sprocket having openings communicating with said recesses to discharge any material collected therein.

12. A feeder according to claim 8 characterized by the end of the belt near which said rotatable supporting means is located is the end opposite to which feed is supplied.

* * * * *